United States Patent [19]

Rumell

[11] 3,884,158

[45] May 20, 1975

[54] RAILROAD CAR WITH HYDRAULICALLY ACTUATED TURNTABLE

[76] Inventor: James A. Rumell, 1955 Vermont, Blue Island, Ill. 61485

[22] Filed: Oct. 29, 1973

[21] Appl. No.: 410,345

[52] U.S. Cl. ............... 105/368 B; 105/455; 214/515
[51] Int. Cl. ............................................... B65j 1/22
[58] Field of Search ........ 105/368 B, 455; 214/38.1, 214/38.8, 515; 296/35 A

[56] References Cited
UNITED STATES PATENTS

| | | | |
|---|---|---|---|
| 3,086,669 | 4/1963 | Rogers | 105/368 B |
| 3,490,389 | 1/1970 | Brown | 105/368 B X |
| 3,516,368 | 6/1970 | Wright | 105/455 |
| 3,581,918 | 6/1971 | Fujioka | 105/455 X |
| 3,788,683 | 1/1974 | Rumell | 296/35 A |

Primary Examiner—M. Henson Wood, Jr.
Assistant Examiner—Gene A. Church
Attorney, Agent, or Firm—Wolfe, Hubbard, Leydig, Voit & Osann, Ltd.

[57] ABSTRACT

An improved railroad transport car and method of unloading its cargo container. The railroad car includes a wheeled flatbed and removable cargo container that is supported on the flatbed by means of a selectively pivotable turntable. The cargo container has retractable and extensible wheels for converting the container from an immobile frame based storage unit to a mobilized container, and selectively operable hydraulic cylinder means are provided for rotating the turntable to a desired angular position relative to the flatbed to permit the container to be rolled off the turntable on either side of the flatbed.

20 Claims, 12 Drawing Figures

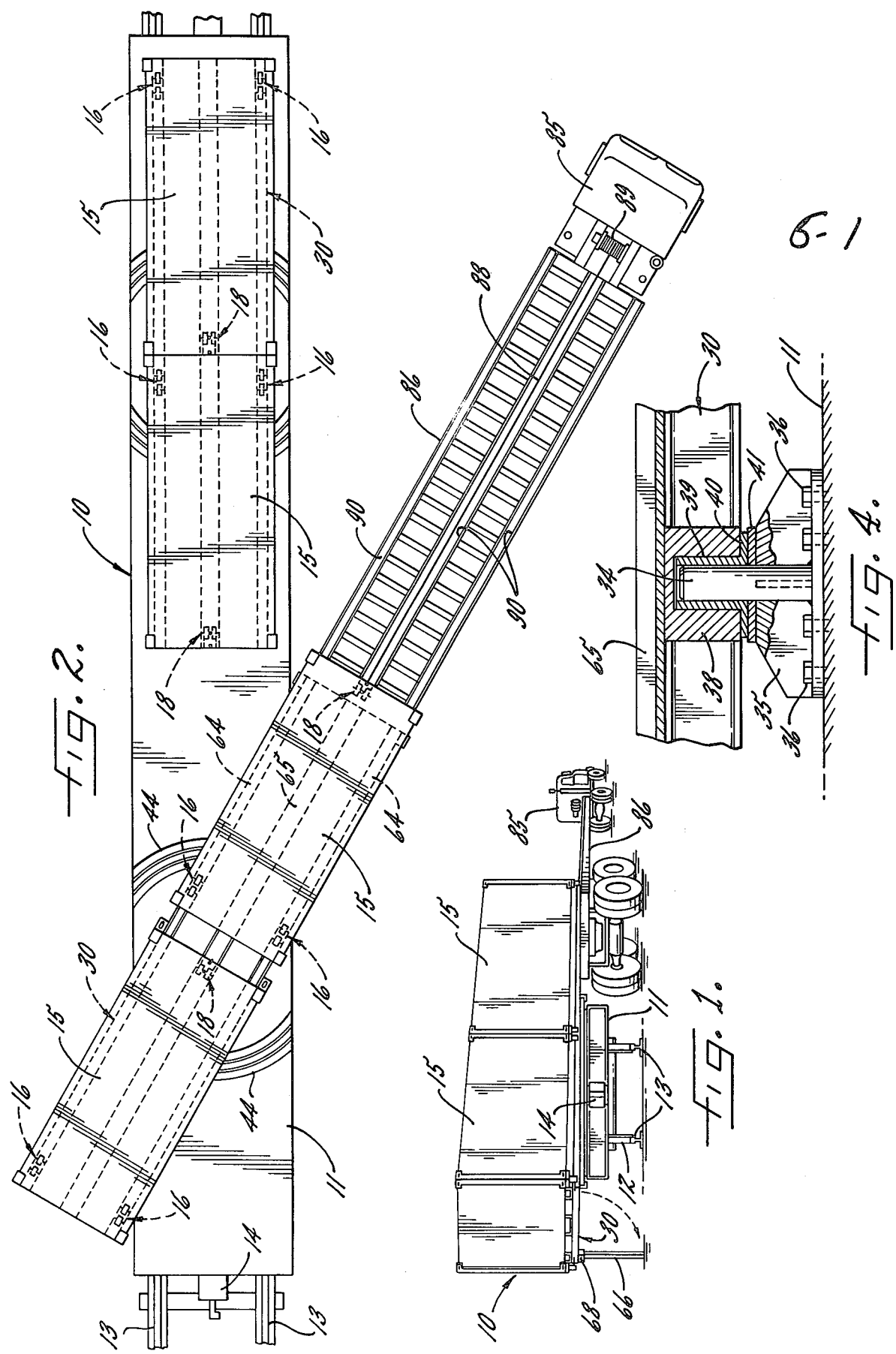

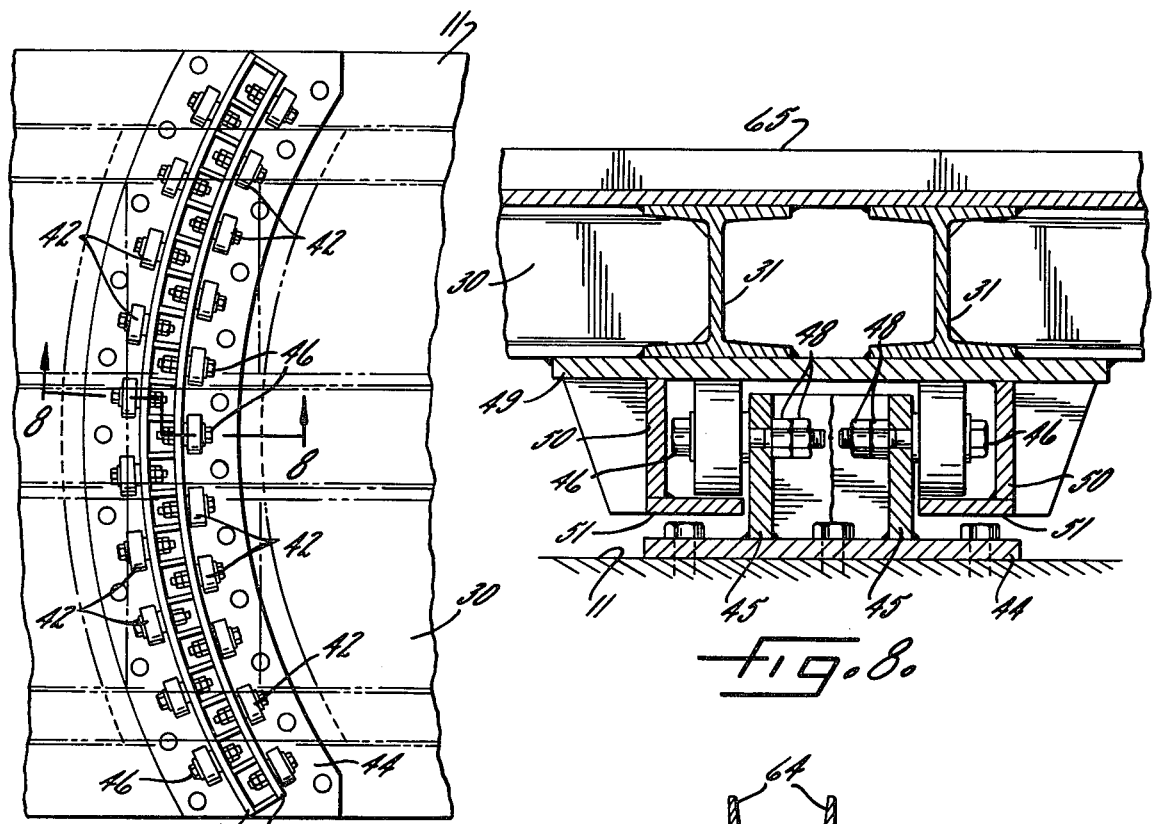
fig. 7.
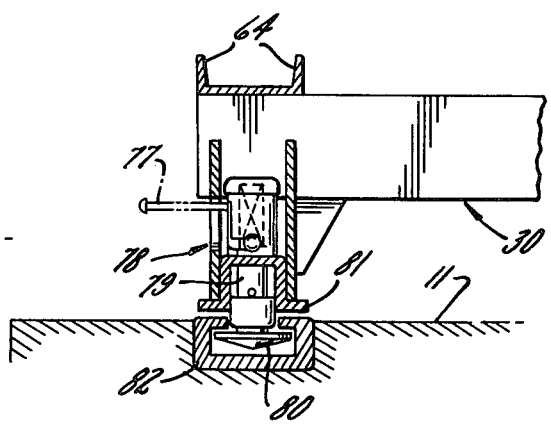
fig. 8.
fig. 12.
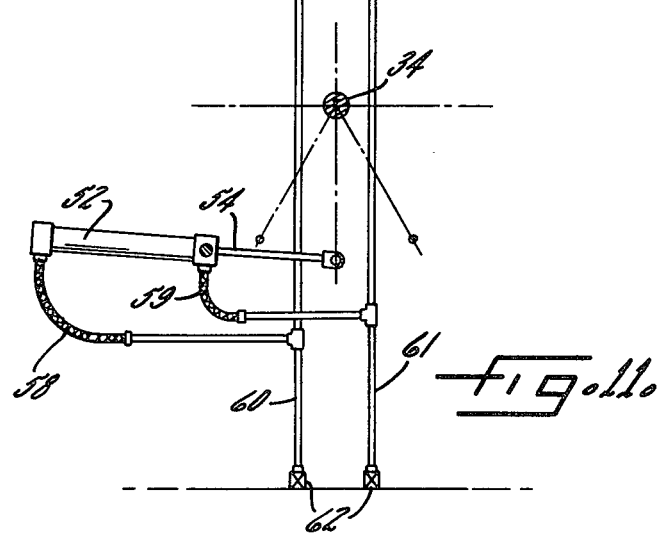
fig. 11.

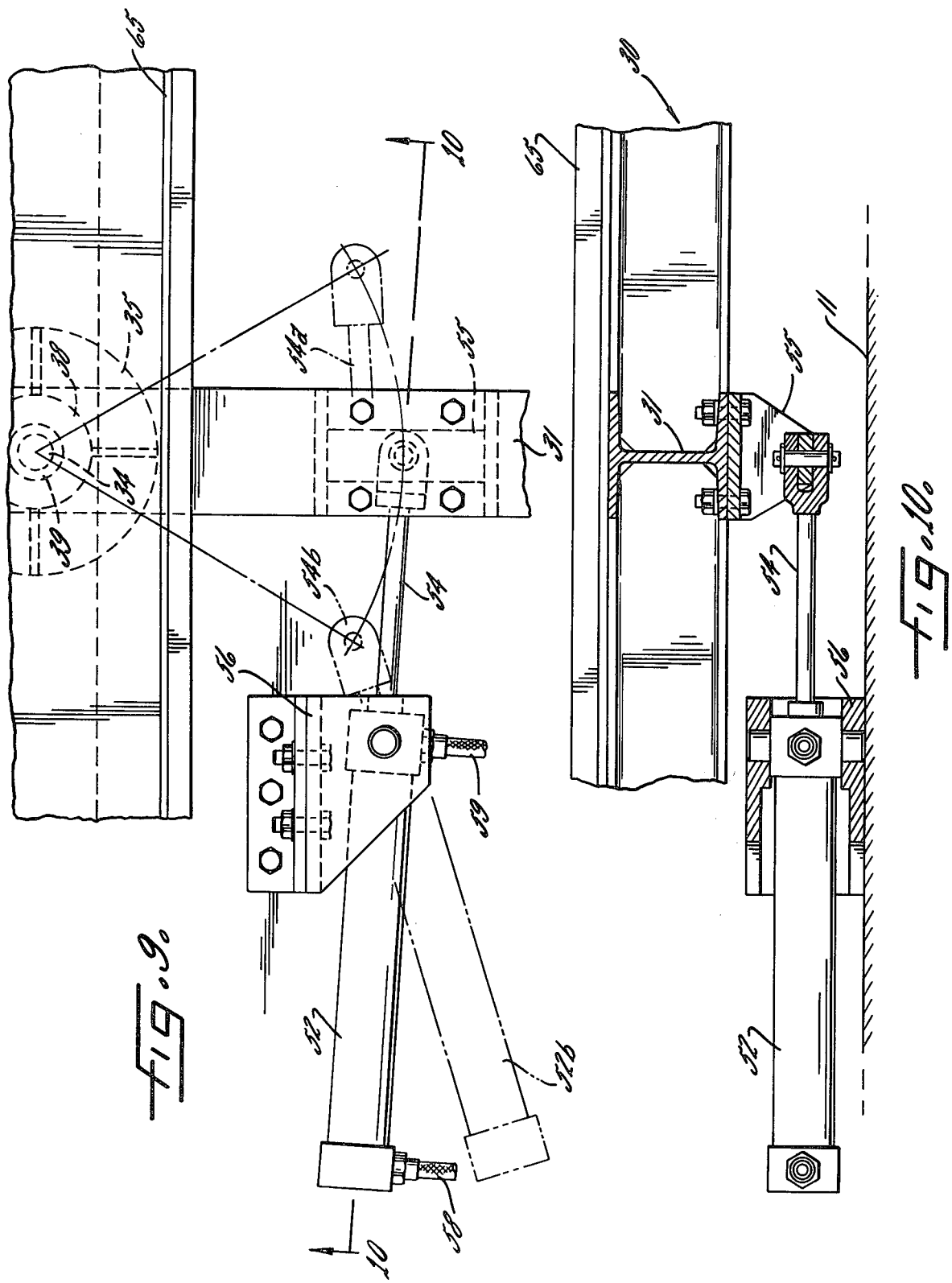

RAILROAD CAR WITH HYDRAULICALLY ACTUATED TURNTABLE

DESCRIPTION OF THE INVENTION

The present invention relates generally to a system for transferring freight by rail, and more particularly, concerns an apparatus and method for transferring freight between a railway car and a highway truck or other unloading station.

In the past several years, considerable interest has developed in the transportation of "intermodal" containers. These containers are designed for transport by truck or rail to a loading dock or station. At present, virtually all commercially suitable intermodal containers that are carried by truck or rail must be loaded and unloaded from the transport vehicle by expensive equipment such as cranes or the like.

It is the object of the present invention to provide a railroad transport car with a resuable freight hauling container that may be rapidly and easily removed and replaced without special lifting equipment. A related object is to provide an efficient method of unloading the cargo container from such a transport car.

A further object is to provide a railroad transport car as characterized above that is of relatively simple construction, and thus economical and efficient to manufacture and use.

Other objects and advantages of the invention will become apparent as the following description proceeds, taken in conjunction with the accompanying drawings, in which:

FIG. 1 is a perspective of a railroad car embodying the present invention shown with one of its container supporting turntables moved to an unloading position adjacent the trailer of a truck;

FIG. 2 is an enlarged top view of the railroad car and truck shown in FIG. 1;

FIG. 4 is an enlarged fragmentary section taken of the plane of line 4—4 in FIG. 3;

FIG. 7 is a plane view of the turntable support for the illustrated railroad car with the location of the turntable outlined in phantom;

FIG. 8 is an enlarged fragmentary section taken in the plane of line 8—8 in FIG. 7;

FIG. 9 is a partial plane view of the drive cylinder for moving the turntable of the illustrated railroad car;

FIG. 10 is a section taken in the plane of line 10—10 in FIG. 9;

FIG. 11 is a schematic view of the drive cylinder shown in FIGS. 9 and 10 and its hydraulic supply lines; and FIG. 12 is an enlarged fragmentaty section taken in the plane of line 12—12 in FIG. 3 showing the locking arrangement for securing the turntable to the railroad car flatbed when in a travel position.

Figure 3:
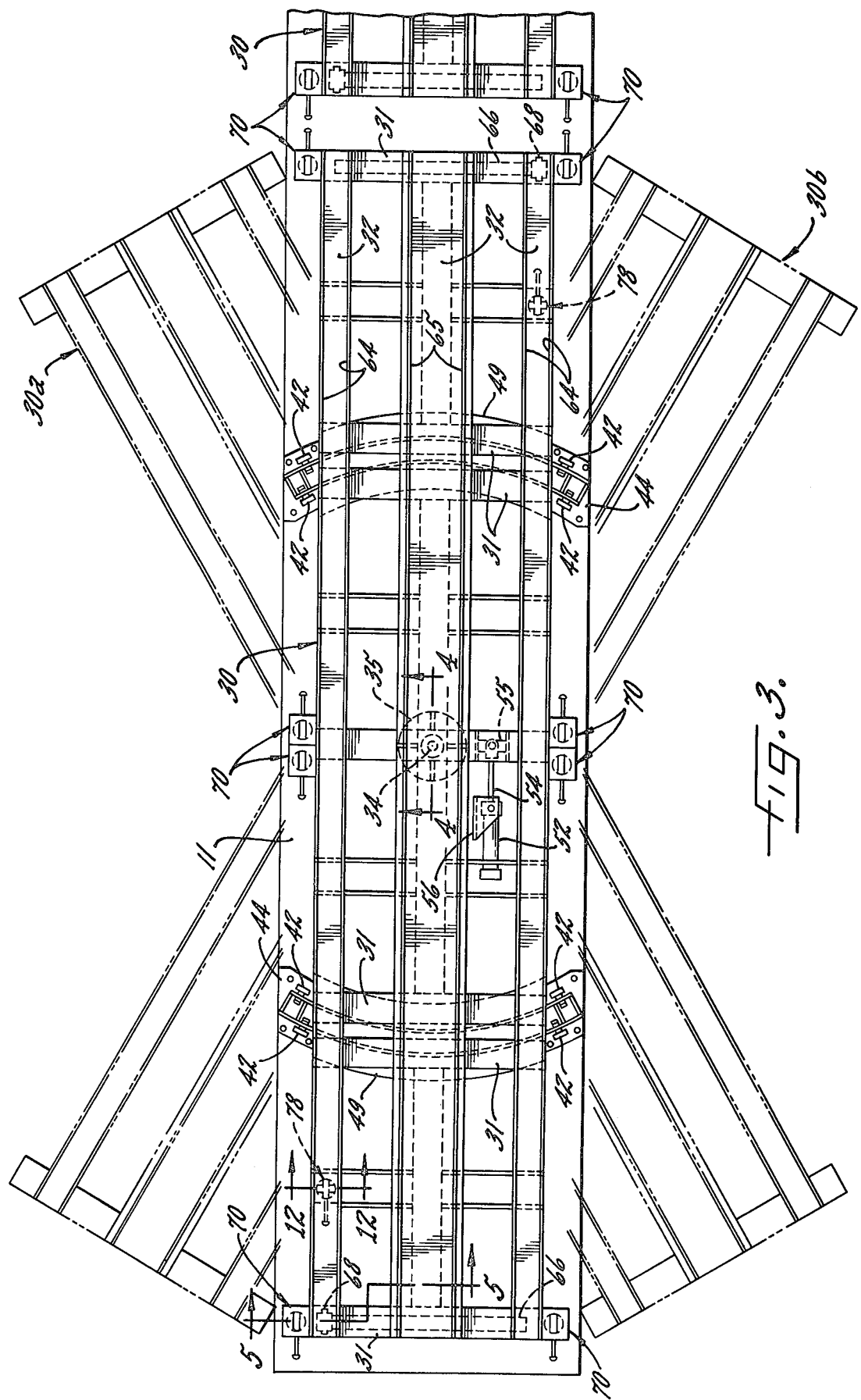
FIG. 3 is an enlarged top view of one-half of the railroad car shown in FIG. 1 with the container removed and the turntable shown in phantom in its extreme opposite rotated positions.

While the invention is susceptible of various modifications and alternative constructions, a certain illustrative embodiment thereof has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring more particularly to FIGS. 1 and 2 of the drawings, there is shown an illustrative railroad car 10 embodying the present invention. The railroad car 10 comprises a flatbed 11 supported on a conventional wheeled frame 12 for movement along railroad tracks 14. For containing and storing freight, a plurality of removable and reusable cargo containers 15 are supported on the flatbed 11. It will be understood that the railroad car 10 may be interconnected with other such cars by conventional hitches 16 for rail transportation.

Figure 5:
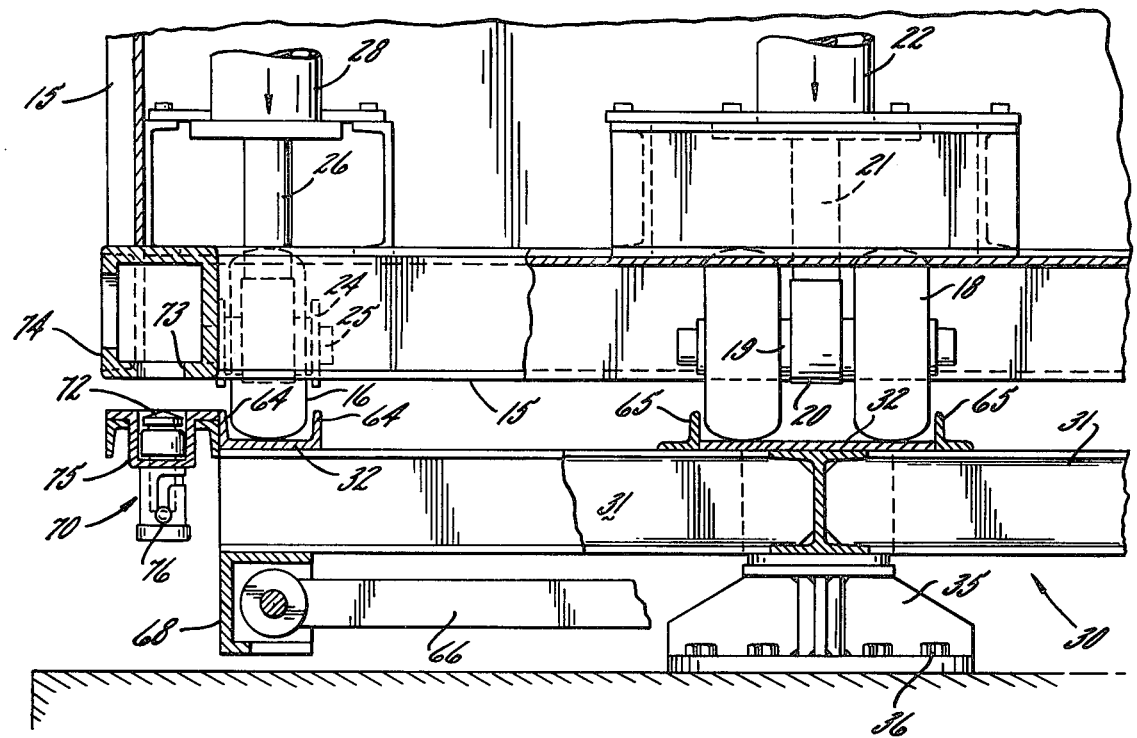
FIG. 5 is an enlarged fragmentary section of the turntable taken in the plane of line 5—5 in FIG. 3, but showing a container supported thereon in its raised mobilized condition.
Figure 6:
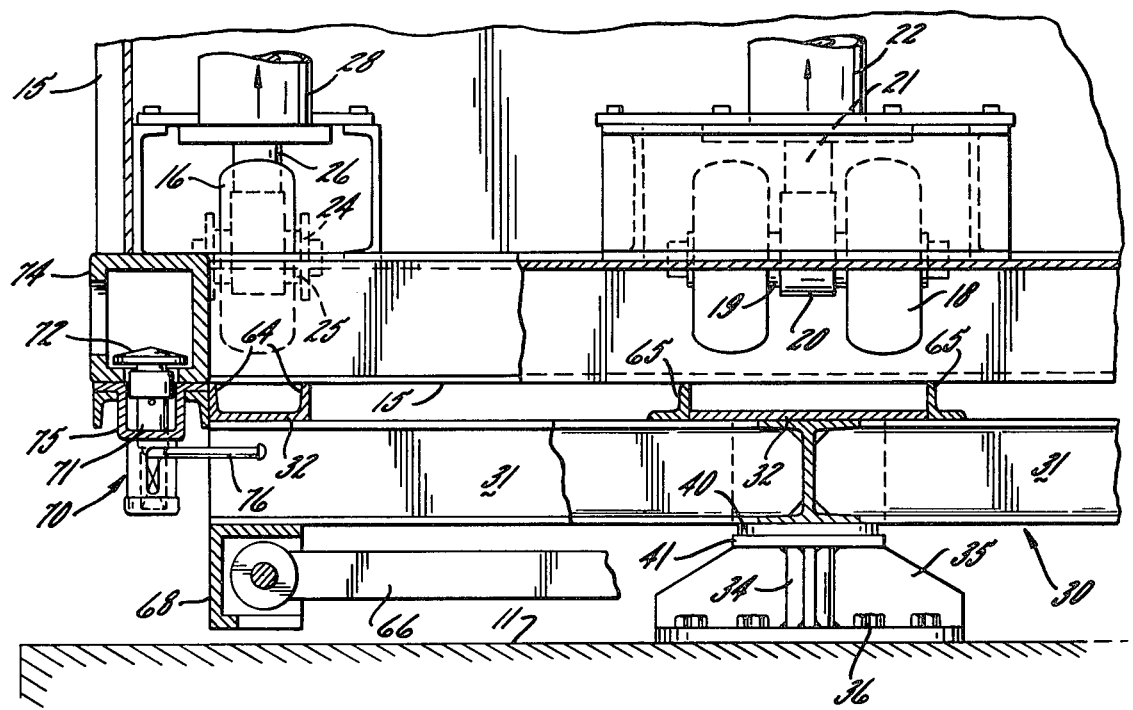
FIG. 6 is a fragmentary section similar to FIG. 5, but showing the container in a lowered and locked position.

The containers 15, which are four in number in the illustrated embodiment, are of the type disclosed in applicant's co-pending application, Ser. No. 269,978 filed July 10, 1972. The containers 15 each are rectangular shaped and have extensible and retractable support dollies 16, 18 adapted to convert the container from an immobile frame based storing container to a mobile wheeled hauling container for easy placement onto and removal from the flatbed of the railroad car. In the illustrated container, as best shown in FIGS. 2, 5 and 6, first and second support dollies 16 are located near the base corners at one end of the container and a third pivotable support dolly 18 is located near the center of the base at the other end of the container. The dolly 18 in this case includes a pair of dolly wheels journaled on a common axle 19 and spaced laterally apart so that an intermediate portion of the axle 19 can be journaled to an ear 20. The ear 20 is connected to a shaft 21 mounted on the piston of a hydraulic cylinder 22 supported within the container. The dollies 16 each comprise a pair of wheels interconnected in longitudinally spaced relation by brackets 24 secured to the respective wheel shafts 25. The brackets 24 are mounted to the lower end of a depending piston rod 26 of a hydraulic cylinder 28 supported within the container. The dollies 16, 18 each are recessed within the outer periphery of the container 15 to permit close positioning of the adjacent container. Appropriate hitches also are provided at opposite ends of the containers for interconnecting one or more of the containers in a train for simultaneous movement, as will become apparent.

To extend and retract the dollies 16, 18 the containers each have a self-contained hydraulic system for operation of the hydraulic cylinders 22, 28. The hydraulic system includes a hydraulic pump, a hydraulic fluid reservoir, and a low voltage direct current motor all contained within the container as described in the applicant's aforesaid co-pending application. Upon energization of the motor, such as by a self-contained 12 volt battery, the pump supplies pressurized fluid to the three hydraulic cylinders 22, 28 via appropriate conduits to cause the piston rods 21, 26 to be moved downward and thereby raise the container so that it is supported by the dollies.

In accordance with the invention, the containers are supported on the railroad car flatbed by turntables that are selectively operable to rotate the containers to an angular position relative to the flatbed for unloading onto a loading dock at a side of the flatbed. In the illustrated embodiment, the railroad car 10 includes two turntables 30 which each support two containers 15. Since the turntables 30 are of identical construction and operation, only one will be described in detail. The turntable 30 in this instance is made up of a plurality of spaced I beam cross members 31 connected by a plurality of suitable longitudinal structural members 32. The turntable is mounted at its geometric center on a pivot pin 34 secured in upstanding relation by means of a bracket 35 fixed to the flatbed 11 by bolts 36, as shown in FIG. 4. Contained within the underside of the turntable 30 is a hub 38 formed with an internal bore for receiving the pivot pin 34. A bearing sleeve 39 is press fit within the hub bore and includes a radial flange 40 that cooperates with a bearing plate 41 mounted on the upper side of the bracket 35.

To provide further support of the turntable 30 for rotary movement, arcuate arrays of rollers 42 are mounted on the flatbed 11 on opposite sides of the pivot pin 34. For supporting the rollers 42, as shown in FIGS. 7 and 8, a base plate 44 having a pair of upstanding curved flanges 45 is mounted on the upper surface of the flatbed 11. The curved flanges 45 support shafts 46 for alternate rollers 42, which in this case are in the form of bolts that each rotatably support a respective one of the rollers 42 and is secured to the flange 45 by a pair of nuts 48. Mounted on the underside of the turntable are bearing plates 49 that ride on the respective arcuate array of rollers 42.

For the purpose of preventing tilting movement of the turntable 30 relative to the flatbed 11, a pair of arcuate retaining members 50 are welded in depending fashion from the bearing plate 49 on opposite sides of each array of rollers 42. The retaining members 50 each include a horizontal flange 51 that extends in closely spaced relation below the underside of the rollers. It will be seen that the horizontal flanges 51 will prevent tilting of the turntable in the event an off-center load is mounted on the turntable 30 and during the course of moving containers onto and off of the turntable.

In order to rotate the turntable 30 from a travel position in overlying relation with respect to the flatcar 11 to a container unloading position at an angle on either side of the flatcar, a hydraulic cylinder 52 with a double action piston is provided for each turntable. The hydraulic cylinder 52 is mounted on the flatcar 11 and has a piston rod 54 connected at its end to the underside of the turntable 11 at a point in radially spaced relation to the pivot pin 34 so that axial extension or retraction of the piston rod 54 imparts a force to the turntable that is substantially tangential to the pivot pin. As shown in FIGS. 9 and 10, the end of the piston rod 54 is secured to the flatbed 11 by a bracket 55 that permits rotational movement of the rod 54 with respect to the turntable 30, and the hydraulic cylinder 52 also is pivotably mounted on the flatbed 11 by a bracket 56 bolted to the flatbed.

For operating each hydraulic cylinder 52, fluid pressure lines 58, 59 are connected at opposite ends of the cylinder (FIGS. 9 and 11). The lines 58, 59 are each connected to a respective fluid supply line 60, 61 that extends transversely across the bed and has conventional disconnects 62 at its opposite end. An external source of pressurized fluid, such as from a power take-off unit of the tractor of a truck upon which a container is to be loaded, may be connected to the disconnects 62 on either side of the flatcar. Preferably, the railroad car carries a fluid reservoir, such as a single 2-gallon tank which is interconnected to the hydraulic cylinders 52 for the two turntables 30. Such a reservoir will provide the fluid necessary for operating the hydraulic cylinders without draining fluid from the external pressure source.

By selectively controlling the flow of pressurized fluid to the lines 58, 60 or the lines 59, 61, the piston rods may be moved in either direction from a central travel position overlying the flatbed 11, shown in solid lines in FIG. 9. When the piston rod is forced outwardly through pressurization of lines 58, 60, the piston 54 is moved to the position 54a shown in phantom in FIG. 9, causing the turntable to rotate to position 30a shown in phantom in FIG. 3. By retracting the piston rod through pressurization of lines 59, 61, the piston rod is moved to position 54b shown in FIG. 9 causing the turntable to be moved to an angular position 30b on the opposite side of the flatbed 11. The pivotable connections 55 and 56 between the piston rod 54 and turntable 30 and between the hydraulic cylinder 52 and flatbed 11 respectively, permit relative rotational movement of the cylinder and piston rod as may be necessary to effect such angular positioning of the turntable.

For guiding movement of a container 15 off the end of the turntable 30 when it has been moved to an unloading position, longitudinally extending guide tracks 64, 65 are provided on the upper surface of the turntable within which the dollies, 16, 18, respectively, of the container are received when in their extended container supporting position. The guide tracks 16 in the illustrated embodiment are in the form of upturned channels which also form part of the structural makeup of the turntable. Since the guide tracks 16 receive the longitudinally aligned corner wheels 16 of the container in this case, they are narrower than the central guide tracks 18 that receive the laterally spaced dolly wheels 18 at the center of the opposite end of the container. As shown in FIG. 5, when the dolly wheels 16, 18 are in their fully extended position, they extend below the base of the container to lift and thereby support the container above the level of the turntable 30 and guide tracks 64, 65. The container 15 is then in a mobilized condition and the guide tracks 64, 65 will guide movement of the container longitudinally along the turntable 30. When the dolly wheels 16, 18 are drawn to their retracted position, as shown in FIG. 5, it will be seen that the wheels terminate above the bottom level of the container base causing the container to rest on the guide tracks 64, 65 in an immobile condition.

When the turntable 30 is in a rotated unloading position, auxiliary means are provided for supporting the ends of the turntable. To this end, the end of each turntable 30 is provided with a pivotable support leg 66 at its opposite ends which can be pivoted from a stored position housed within the underside of the turntable, as shown in FIG. 5, to a depending position engaging the road bed adjacent the railroad track to provide support for the overhanging end of the turntable, as shown in FIG. 1. It will be understood that suitable locking means may be utilized for securing the legs 66 in their stored position. The legs 66 in this case each are rotatably supported by a bracket 68 depending from the underside of the turntable 30. When the leg 66 is in its stored position, as shown in FIG. 5, neither the leg 66 nor bracket 68 interferes with rotational movement of the turntable relative to the flatbed.

To lock the containers 15 to the turntable in its immobile condition for transport on the flatbed, the turntable 30 has twist locks 70 positioned for securing each corner of the containers. The illustrated twist locks 70, shown in FIGS. 5 and 6, each have a vertical stem 71 with an elongated head 72 at the upper end thereof. Each bottom corner of the container 15 has a corner casting 74 formed with an elongated bottom aperture 73 adapted to receive a respective one of the twist lock heads 72. The stem 71 is supported in the turntable for relative rotational and axial movement and preferably is biased in an upward direction by a suitable spring means not shown. A handle 76 is connected to the stem to facilitate such movement. As will be apparent, the container may be placed upon the turntable so that each corner casting 74 is positioned over one of the twist locks 70. By then raising the twist lock head 72 into the corner casting and rotating it to a transverse position relative to the corner casting slot by means of the handle 76, the head will restrain the container 15 from lateral movement with respect to the turntable 30, as shown in FIG. 6. Suitable means, such as a spring detent or a transverse handle receiving slot, may be provided for securing the stem 71 in a retracted position within its bracket 75 as shown in FIG. 5 when the container is being removed or placed onto the turntable.

Twist locks 78 also are provided for positively locking the turntable 30 to the flatbed 11 when it is in its travel position. The twist locks 78, shown in detail in FIG. 12, are substantially the same as the twist locks 70 for the containers. The twist locks 78 include a stem 79 with an elongated head 80 mounted in a channel 81 on the underside of the turntable for rotary and axial movement through operation of a handle 77. A plurality of channels 82 each formed with an elongated aperture such as described above are provided within the top surface of the flatbed 11 for receiving the respective twist lock heads 80 when the turntable is overlying the flatcar.

To unload the containers 15 from the railroad car 10, the railroad car is brought to stop adjacent an unloading platform at one side of the flatbed 11 with the containers locked in their travel position on the flatcar. The unloading platform, for example, may be a loading dock or the chassis of a truck. In FIG. 1 there is shown a truck 85 with its chassis 86 positioned at an angle of about 30° to the railroad car 10. The twist locks 70 and 78 for the container and turntable first are unlocked. The disconnects 62 on the side of the flatcar 11 on which the truck chassis 86 is parked may then be connected to a pressurized hydraulic system, such as a power take-off unit of the tractor of the truck 85, in which case the driver can then operate the turntable from the hydraulic console for the truck. By supplying pressurized fluid to the appropriate hydraulic line 60 or 61 the turntable may be rotated so that the end thereof is positioned adjacent the end of the chassis 86. The auxiliary support legs 66 may then be lowered to support the overhanging ends of the turntable. To bridge any gap between the end of the turntable 30 and the end of the chassis 86, or to compensate for any slight difference in elevation between the two ends it will be understood that suitable ramps may be positioned across the adjacent ends of the turntable and chassis. Such ramps may be pivotably mounted on the end of the turntable guide tracks 64, 65, or on the end of the chassis, so that they can be easily swung to a bridging position, or alternatively, a separate removable ramp could be used.

Either before or after the turntable 30 has been rotated to its unloading position, the container dollies, 16, 18 may be extended to their container supporting position, as shown in FIG. 5, so as to permit rolling movement of the container along the longitudinal guide tracks 64, 65. To move the containers 15 off the turntable and onto the truck chassis 86 in the illustrated embodiment, a rope 88 of a winch 89 supported at the rear of the truck tractor is secured to the container 15 adjacent the end of the chassis. The two containers 15 carried by the turntable 30 preferably are connected together by appropriate hitches so that operation of the winch 89 will draw both containers onto the chassis. To guide such movement of the containers, the chassis 86 also has longitudinal tracks 90 for receiving the container dolly wheels 16, 18 and guiding their rolling movement. When the containers are in place on the truck chassis 86, the support legs 66 may be raised to their stored positions and the turntable 30, through operation of the hydraulic cylinder 52 returned to its transport position overlying the flatcar 11 where it is again secured to the flatcar by the twist locks 78. The driver of the truck can then remove the fluid pressure source from the disconnects 62, and by retracting the container dollies 16, 18 the container is lowered to an immobile position on the chassis to complete the transfer.

It will be appreciated that the railroad car of the present invention thereby permits the quick transfer of relatively large heavy cargo containers from the railroad car to the loading platform or truck chassis without the need for expensive, special lifting equipment as heretofore been customarily used. Moreover, the unloading of such containers may be effected by a single person, generally the driver of the truck, so as to reduce labor costs incident to the transfer operation. While the illustrated embodiment discloses a railroad car having two turntables with each carrying a pair of cargo containers, the turntables may each carry a single large container. Preferably, the turntables are of such length to support a single 40 foot length container or two 20 foot length containers.

From the foregoing, it will be further understood that the method of the present invention provides a relatively simple and efficient system for unloading such cargo containers from their railroad car. Basically, the method involves unlocking the container from the turntable on which it is mounted to free the container for movement relative to the turntable, extending the wheels of the container to elevate the container relative to the turntable for the rolling movement, rotating the turntable and the container supported thereon until the end of the turntable is adjacent the unloading platform, and moving the container on its support wheels longitudinally off the end of the turntable onto the loading platform.

I claim as my invention:

1. A railroad transport vehicle comprising a flatbed, wheel means supporting said flatbed for movement on railroad tracks, a turntable mounted on said flatbed for relative pivotable movement about a pivot point, a container having support wheels and being longitudinally moveable on said turntable, said turntable having longitudinal guide tracks for receiving the wheels of said container and guiding movement of said container with respect to said turntable, selectively operable fluid cylinder means for rotating said turntable from a travel position in overlying relation with said flatbed to an unloading position at a sufficient angle with respect to said flatbed to permit said container to be moved off said turntable at the side of said flatbed, said fluid cylinder means including a cylinder mounted on said flatbed and a reciprocal cylinder rod associated with said cylinder, means connecting said cylinder rod to said turntable at a point radially spaced from said pivot point so that actuation of said cylinder causes said rod to exert a force on said turntable that is substantially tangential with respect to said pivot point, means for releasably locking opposite ends of said turntable to said flatbed when in said travel position, and means for releasably locking said container to said turntable.

2. The railroad transport vehicle of claim 1 in which said cylinder is a hydraulic cylinder with supply lines that terminate in disconnects that are accessible for selective connection to a pressure source external to said vehicle.

3. The railroad transport vehicle of claim 1 in which said pivot point is an upstanding pivot pin fixed on said flatbed, and including a plurality of rollers arranged in arcuate arrays on opposite sides of said pivot pin for supporting said flatbed for rotational movement relative to said flatbed, retaining means depending from said turntable and encompassing said rollers for preventing substantial tilting movement of said turntable relative to said rollers and flatbed.

4. The transport vehicle of claim 3 in which said retaining means has a generally L-shaped cross-section with a lowermost horizontal flange positioned in close relation to the underside of said rollers.

5. The railroad transport vehicle of claim 2 in which said cylinder is a hydraulic cylinder pivotably mounted on said flatbed, and means pivotably securing said piston rod to said turntable.

6. The railroad transport vehicle of claim 1 in which said turntable locking means are twist locks each having an extensible and retractable lug mounted on said turntable for receipt in a locking aperture in said flatbed, and said container locking means are twist locks each having an extensible and retractable lug mounted on said turntable for receipt in a locking aperture in said container.

7. The railroad transport vehicle of claim 1 in which said turntable is rotatable by said fluid cylinder means to angular positions on either side of said flatbed.

8. A railroad car comprising a flatbed with a wheeled frame for transport on railroad tracks, a turntable rotatably mounted on said bed, a cargo container mounted on said turntable and having retractable and extensible support wheels, said cargo container being supported in an immobile condition on said turntable when said support wheels are in a retracted position, selectively operable means for extending said wheels to support said container for rolling movement in a longitudinal direction relative to said turntable, and means for rotatably moving said turntable to a desired angular position relative to said flatbed to permit moving said container off said turntable at one side of said flatbed.

9. The railroad car of claim 8 in which said turntable has longitudinally extending guide tracks for receiving said container support wheels when in an extended position and for guiding rolling movement of said container relative to said turntable.

10. The railroad car of claim 9 in which said guide tracks are upturned channels mounted on said turntable.

11. The railroad car of claim 8 in which said means for rotating said turntable is a hydraulic cylinder mounted on said flatbed, said hydraulic cylinder having supply lines that terminate in disconnects that are accessible for selective connection from a pressure source external to said railroad car.

12. The railroad car of claim 8 in which said turntable is rotatable about a pivot pin interposed between said turntable and flatcar.

13. The railroad car of claim 12 in which an arcuate arrangement of rollers are mounted on said flatbed on opposite sides of said pivot pin for supporting relative rolling movement of said turntable, said rollers each being supported for rotational movement on upstanding brackets secured to said flatbed, and retaining means depending from the underside of said turntable for preventing substantial tilting movement of said turntable relative to said rollers and flatbed.

14. The railroad car of claim 13 in which said retaining means encompasses in close relation the underside of said rollers.

15. The railroad car of claim 8 in which said turntable has a pivotable support leg at each end thereof, said legs each being pivotable from a stored position adjacent the underside of said turntable to a depending position perpendicular to said turntable for providing support for the end of said turntable when moved to an angular position overhanging said flatbed.

16. The railroad car of claim 8 in which there are a pair of said turntables mounted on said flatbed in longitudinally spaced relation, and each of said turntable supports at least one of said containers.

17. A method of unloading a cargo container with retractable support wheels from the turntable of a railroad car on which it is releasably locked to a loading platform at one side of said railroad car comprising the steps of:
   a. unlocking said container from said turntable to free said container for movement relative to said turntable,
   b. extending the wheels of said container to elevate said container relative to said turntable and support the container for rolling movement on said wheels,
   c. rotating said turntable and the container supported thereon until the end of said turntable is adjacent said unloading platform, and
   d. moving said container on its support wheels longitudinally off the end of said turntable on to said loading platform.

18. The method of claim 17 in which said loading platform is a chassis of a truck, and said container is moved off said turntable by securing thereto the end of a rope from a wench mounted on said truck and operating said wench to pull said container from said turntable onto said chassis.

19. The method of claim 17 in which two containers are supported on said turntable, and including the steps of connecting said containers together in end to end relation, and simultaneously moving said containers off said turntable.

20. The method of claim 17 including supporting the ends of said turntable by ancillary support means after said turntable is pivoted to an unloading position adjacent said platform.

* * * * *